United States Patent [19]
Schantz

[11] Patent Number: 5,694,827
[45] Date of Patent: Dec. 9, 1997

[54] DUMP BODY CUSHION

[75] Inventor: Ronald K. Schantz, Chagrin Falls, Ohio

[73] Assignee: Euclid-Hitachi Heavy Equipment, Inc., Cleveland, Ohio

[21] Appl. No.: 581,926

[22] Filed: Jan. 2, 1996

[51] Int. Cl.$^6$ ..................................................... F15B 15/22
[52] U.S. Cl. ................................. 91/406; 92/53; 92/85 B
[58] Field of Search ............................. 92/52, 53, 85 R, 92/85 B; 91/404, 405, 406

[56] References Cited

U.S. PATENT DOCUMENTS

| | | |
|---|---|---|
| 2,349,244 | 5/1944 | Brown . |
| 2,358,650 | 9/1944 | Maude . |
| 2,430,760 | 11/1947 | Daugherty . |
| 2,512,205 | 6/1950 | Hall . |
| 2,699,150 | 1/1955 | Ziskal . |
| 2,897,791 | 8/1959 | Routledge . |
| 3,023,739 | 3/1962 | Dickson, Jr. et al. . |
| 3,186,305 | 6/1965 | Lorimer . |
| 3,202,062 | 8/1965 | Burden . |
| 3,251,278 | 5/1966 | Royster . |
| 3,415,169 | 12/1968 | Naddell . |
| 3,442,178 | 5/1969 | Daniels . |
| 3,571,855 | 3/1971 | Hofer et al. . |
| 3,695,378 | 10/1972 | Garrison et al. . |
| 3,713,666 | 1/1973 | Cheers et al. . |
| 3,726,187 | 4/1973 | Lewis . |
| 3,773,348 | 11/1973 | Davis . |
| 3,989,301 | 11/1976 | Umeda et al. . |
| 3,998,132 | 12/1976 | Rasigade ..................... 91/406 X |
| 4,006,666 | 2/1977 | Murray . |
| 4,033,235 | 7/1977 | Berg . |
| 4,132,153 | 1/1979 | Grotness et al. . |
| 4,181,066 | 1/1980 | Kitchen et al. . |
| 4,240,332 | 12/1980 | Deutsch . |
| 4,250,793 | 2/1981 | Berg . |
| 4,292,886 | 10/1981 | Weber . |
| 4,344,570 | 8/1982 | Paseman . |
| 4,531,780 | 7/1985 | Boczkiewicz . |
| 4,593,606 | 6/1986 | Klatt et al. . |
| 4,609,135 | 9/1986 | Elliesen . |
| 4,616,879 | 10/1986 | Booher . |
| 4,700,611 | 10/1987 | Kancko . |
| 4,706,781 | 11/1987 | Ikimi et al. . |
| 4,798,125 | 1/1989 | Chang et al. . |
| 4,922,722 | 5/1990 | Kazumoto et al. . |
| 5,004,394 | 4/1991 | Goodwin et al. . |
| 5,020,857 | 6/1991 | Bertelson . |
| 5,024,635 | 6/1991 | Robinson . |
| 5,063,328 | 11/1991 | Kamimura . |
| 5,063,828 | 11/1991 | Kamimura . |
| 5,125,325 | 6/1992 | Czukkermann . |
| 5,193,431 | 3/1993 | Propsting et al. . |
| 5,193,433 | 3/1993 | Reimer . |
| 5,224,413 | 7/1993 | Herner . |
| 5,249,843 | 10/1993 | Hagenbuch et al. . |
| 5,273,405 | 12/1993 | Chalmers et al. . |
| 5,286,138 | 2/1994 | Goodwin . |
| 5,309,817 | 5/1994 | Sims . |
| 5,333,984 | 8/1994 | Bayne et al. . |
| 5,429,035 | 7/1995 | Kaneko et al. ............... 91/405 X |

FOREIGN PATENT DOCUMENTS

| | | |
|---|---|---|
| 52-1380 | 1/1977 | Japan . |
| 994820-A | 2/1983 | U.S.S.R. . |

Primary Examiner—Hoang Nguyen
Attorney, Agent, or Firm—Watts, Hoffmann, Fisher & Heinke Co.

[57] ABSTRACT

An apparatus for cushioning a body of a dump vehicle when the body is lowered, including structure defining a fluid passageway between first and second end portions of the structure. The structure is adapted to be disposed in a fluid pressure operated actuator used to raise and lower a body of a dump vehicle. When the structure is disposed in such actuator the passageway extends in a longitudinal direction of such actuator and the second end portion communicates with an interior of such actuator. A cushioning spool is adapted to be connected to such actuator for moving in the longitudinal direction into the passageway. A poppet includes an orifice that receives the spool for enabling the poppet to be slidably movable on the spool in the longitudinal direction.

23 Claims, 9 Drawing Sheets

DUMP BODY CUSHION

FIELD OF THE INVENTION

This invention relates to a cylinder connected to a body and support structure of a dump vehicle, and more particularly, to method and apparatus for cushioning the dump body in the last several inches of stroke when it is lowered.

BACKGROUND OF THE INVENTION

The present invention is particularly applicable, although not exclusively, to a cylinder used for raising and lowering the body of a dump vehicle such as a dump truck. Such cylinders are pivotally connected at one end to the dump body, and at the other end to a frame of the dump vehicle. The type of cylinder that is typically used in dump vehicles is a multi-stage telescoping cylinder, such as the cylinder disclosed in U.S. Pat. No. 3,415,169, which is incorporated herein by reference in its entirety.

Dump bodies are often heavily loaded with slag or fill, for example. As a result, when such a dump body approaches the end of its lowering stroke back to the vehicle frame, the weight of the dump body, including the weight of its load, leads to wear and fatigue of the cylinder. The weight of the dump body and its load also increase the velocity at which the dump body is lowered, causing the dump body to heavily impact the vehicle frame, which may damage the cylinder, the dump body and the frame.

The U.S. Pat. No. 3,415,169 discloses a cylinder with a spring-loaded tubular valve. The tubular valve has longitudinal openings along its length and is biased at one end against a boss connected to an outer cylinder. A check valve is located in the boss. When the dump body is lowered, fluid passes into the end of the valve to be discharged from the cylinder. Near the end of the lowering stroke, the end of the boss is moved against the end of the valve, forcing fluid to flow only through the longitudinal openings of the valve. This decreases the rate at which the cylinder collapses.

SUMMARY OF THE INVENTION

The present invention pertains to an apparatus for decreasing the retracting rate of a fluid pressure operated actuator such as a multi-stage telescoping cylinder used to raise and lower a dump body. The apparatus prevents the dump body from being lowered at an excessive velocity, and cushions the dump body in the last several inches of stroke before the dump body impacts the frame. The apparatus includes fluid transfer structure defining a fluid passageway between first and second end portions of the structure in a longitudinal direction of the cylinder. A source of pressurized fluid is connected to the first end portion of the structure. The second end portion of the structure communicates with an interior of the cylinder. A cushioning spool connected to the cylinder moves into and out of the fluid passageway, the spool moving into the fluid passageway for retract cushioning. A poppet has a central interior surface defining an orifice that receives the spool and enables the poppet to be slidably movable on the spool in the longitudinal direction toward and away from the fluid transfer structure. As the poppet slides toward the structure it restricts the discharge of fluid into the passageway and out of the cylinder, thereby cushioning the dump body as it is lowered.

In a preferred embodiment of the invention, the apparatus includes a spool having a partial frustoconical portion tapered in the longitudinal direction. The spool has a first cylindrical portion of a first diameter and a second cylindrical portion of a second diameter, which is larger than the first diameter. Each of the cylindrical portions is disposed near an end of the frustoconical portion. The spool has a cylindrical body portion and a cylindrical head portion having a larger diameter than the second cylindrical portion.

In this preferred embodiment the poppet is disk-shaped. The diameter of the poppet orifice is greater than the diameter of the second cylindrical portion of the spool, forming a fluid passageway between the spool and the interior surface of the poppet. The poppet has a central protrusion around the orifice for abutting against the second conduit end portion.

Another embodiment of the present invention pertains to a fluid pressure actuated cylinder for cushioning the dump body when it is lowered. The cylinder is pivotally connected at a first end portion to either the body or the support structure of the dump vehicle. The cylinder is pivotally connected at a second end portion to the other of the body or the support structure of the dump vehicle. The fluid transfer structure is disposed in the cylinder. The first structure end portion is adapted to be connected to the source of pressurized fluid and the second structure end portion communicates with an interior of the cylinder. The cushioning spool is disposed in the cylinder. The poppet central orifice receives the spool for enabling the poppet to be slidably movable on the spool in the longitudinal direction.

In a method according to the present invention the body of the dump vehicle is lowered by discharging fluid from the cylinder through the passageway and to the fluid source. The spool is moved in the longitudinal direction into the passageway. The poppet is slid along the spool toward the fluid transfer structure. As the poppet approaches the structure it decreases the discharge of fluid into the passageway, thereby cushioning the dump body. The method may also include the step of decreasing the pressure in the cylinder at a substantially uniform rate using the frustoconical spool portion. The poppet may be moved into direct contact with the second structure end portion, in which case fluid entering the passageway flows substantially only between the poppet and the spool.

Other embodiments of the invention are contemplated to provide particular features and structural variants of the basic elements. The specific embodiments referred to as well as possible variations and the various features and advantages of the invention will become better understood from the detailed description that follows, together in connection with the accompanying drawings.

DETAILED DESCRIPTION OF PREFERRED EMBODIMENTS

Figure 1:
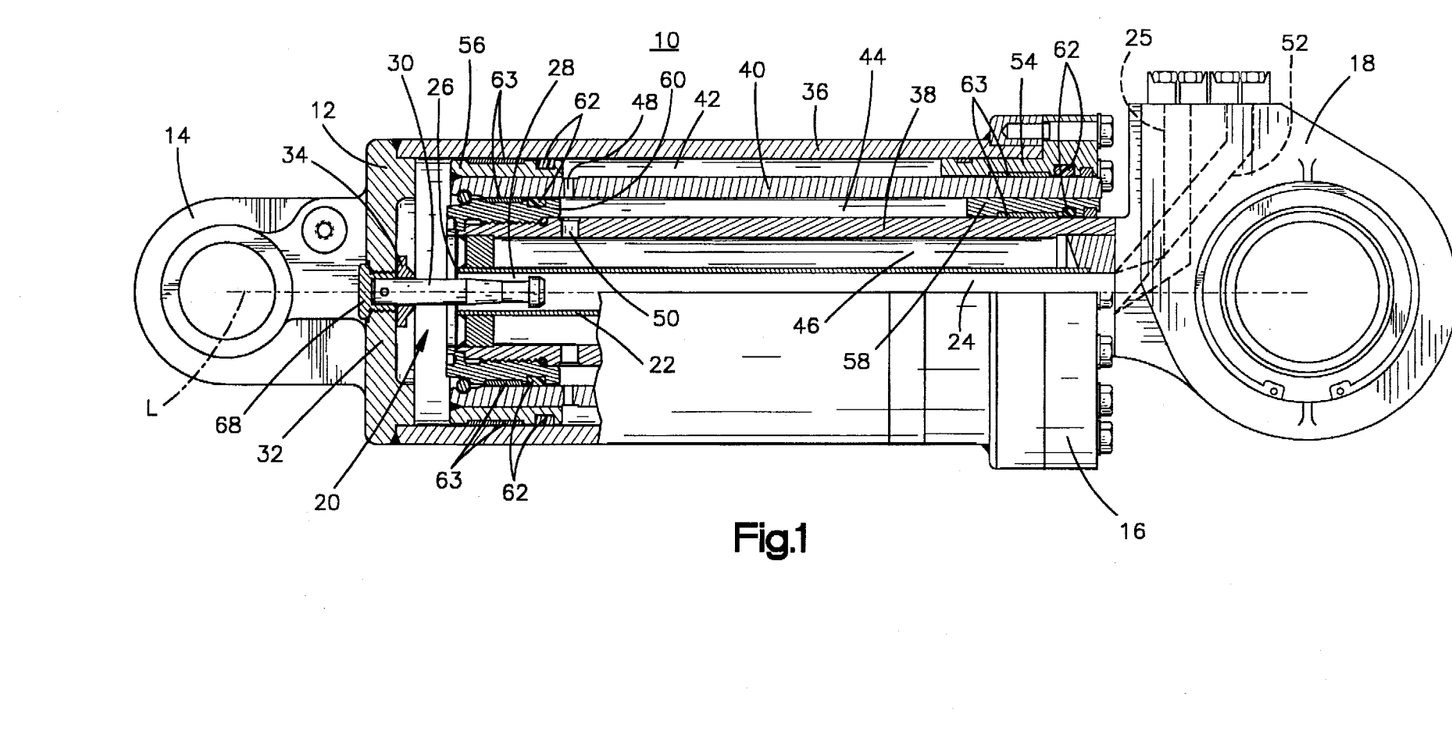
FIG. 1 is a partial cross-sectional view of a cylinder constructed in accordance with the invention.

Turning now to the drawings, FIG. 1 shows a multistage telescoping hydraulic cylinder 10 pivotally connected at a first end portion 12 to a body of a dump vehicle via a mounting eye portion 14. The cylinder 10 is also pivotally connected at a second end portion 16 to a frame of the dump vehicle via a mounting eye portion 18. The cylinder 10 includes a cushioning apparatus 20 for cushioning the retraction of the cylinder 10 when the dump body is lowered.

The cushioning apparatus 20 includes a fluid transfer structure or conduit 22 elongated along a longitudinal direction L and radially located in a central portion of the cylinder 10. The conduit 22 is connected at a first end portion 24 to a port 25, which is connected to a tank of pressurized oil (not shown). A conduit mouth 26 is located at a second end portion 28 of the conduit 22 and is disposed in the cylinder 10. A cushioning spool 30 is connected to an end cap 32 of the cylinder 10 in radial alignment with the conduit 22 for moving into and out of the conduit 22. A poppet 34 is slidably movable on the cushioning spool 30 in the longitudinal direction toward and away from the conduit 22. During retraction of the cylinder 10, the spool 30 moves into the conduit 22 and the poppet 34 approaches the conduit 22. This restricts the discharge of oil from the cylinder 10 through the conduit 22, thereby cushioning the dump body when it is lowered.

The cylinder 10 includes an outer cylinder 36 preferably pivotally connected to the body of the dump vehicle and concentric with the conduit 22. The cylinder 10 also preferably includes an inner cylinder 38 concentric with the conduit 22 and radially disposed between the outer cylinder 36 and the conduit 22. The inner cylinder 38 is preferably pivotally connected to the frame of the dump vehicle. An intermediate cylinder 40 concentric with the conduit 22 is preferably radially disposed between the inner cylinder 38 and the outer cylinder 36.

An annular outer passageway 42 is located between the outer and intermediate cylinders 36, 40; an annular intermediate passageway 44 is located between the intermediate and inner cylinders 40, 38; and an annular inner passageway 46 is located between the inner cylinder 38 and the conduit 22. The outer passageway 42 is in fluid communication with the intermediate passageway 44 via one or more transverse openings 48. The intermediate passageway 44 is in fluid communication with the inner passageway 46 via one or more transverse openings 50. The inner passageway 46 is connected at one end to a port 52, which is connected to the tank of pressurized oil.

An annular outer piston 54 is connected to the outer cylinder 36 and disposed in the outer passageway 42 between the outer and intermediate cylinders 36, 40. The outer piston 54 is adapted to engage an annular outer stop member 56 connected to the intermediate cylinder 40. An annular inner piston 58 is connected to the intermediate cylinder 40 and disposed in the intermediate passageway 44 between the intermediate and inner cylinders 40, 38. The inner piston 58 is adapted to engage an annular inner stop member 60 connected to the inner cylinder 38. The pistons 54, 58 and the stop members 56, 60 are connected to the cylinders 36, 38 and 40 in any manner known to those skilled in the art. Seals 62 and bearings 63 are provided between the cylinders and the pistons and between the cylinders and the stop members, in a manner known in the art.

Figure 2:
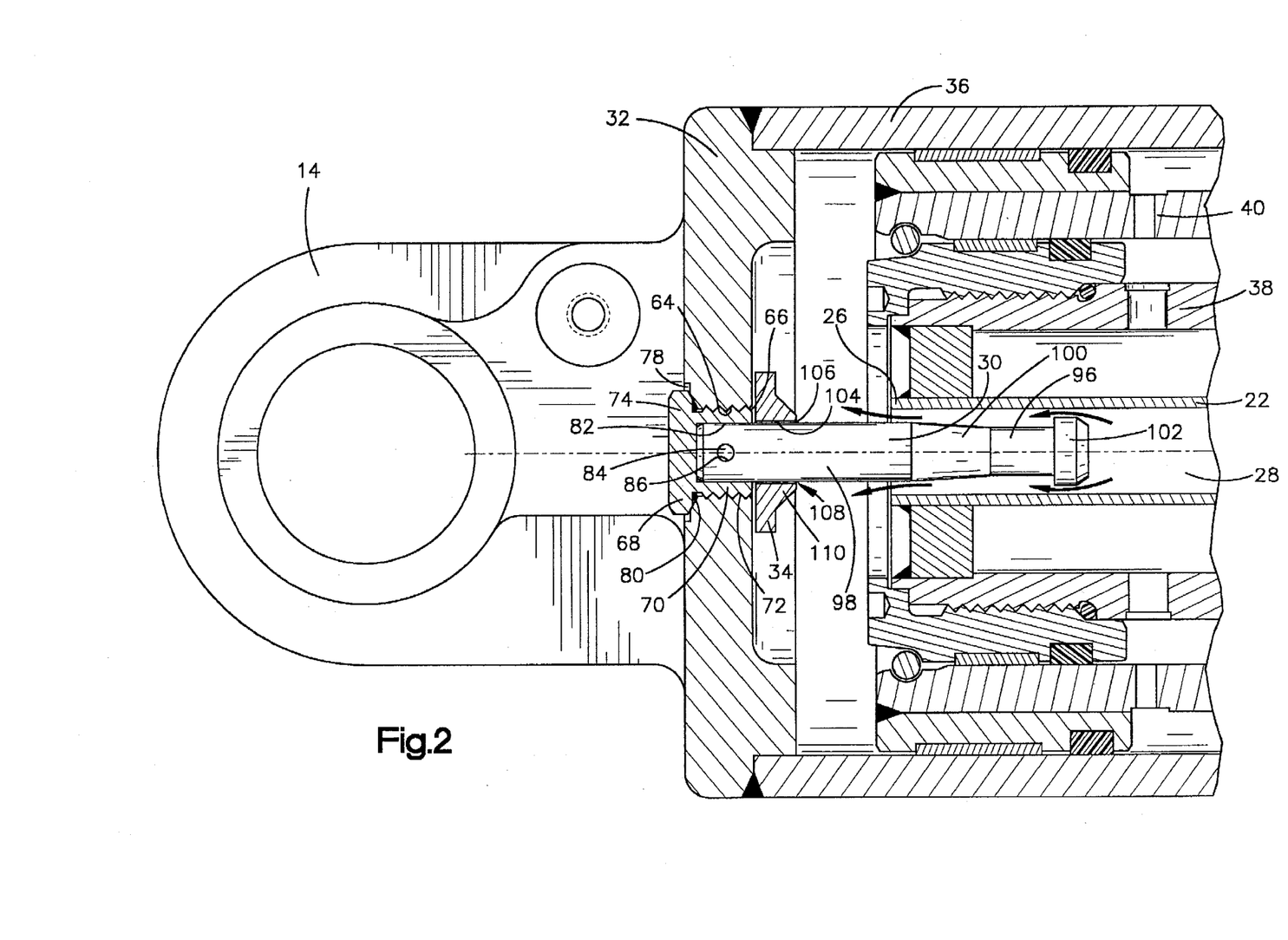
FIG. 2 is an enlarged cross-sectional view of the cylinder at the beginning of a stroke for raising a dump body connected to the cylinder.

The end cap 32 is sealingly connected to the first end portion 12 of the outer cylinder 36. An interiorly threaded surface 64 defines a longitudinally extending opening in the end cap 32. A plug 68 has a body portion 70 with an exteriorly threaded surface 72 in threaded engagement with the interiorly threaded surface 64. A head portion 74 of the plug 68 is disposed in a recess 78 of the end cap 32. A seal such as an O-ring seal 80 is preferably disposed between the head portion 74 and the end cap 32. The plug 68 has a central blind bore 82 in which the spool 30 is disposed. The spool 30 is connected to the plug 68, for example, by a transverse pin 84 disposed in diametrically opposed openings in the plug (not shown) and through a transverse opening 86 in the spool 30. It will be appreciated that the spool 30 may be connected to the cylinder 10 by other means known to those skilled in the art.

Figure 2A:
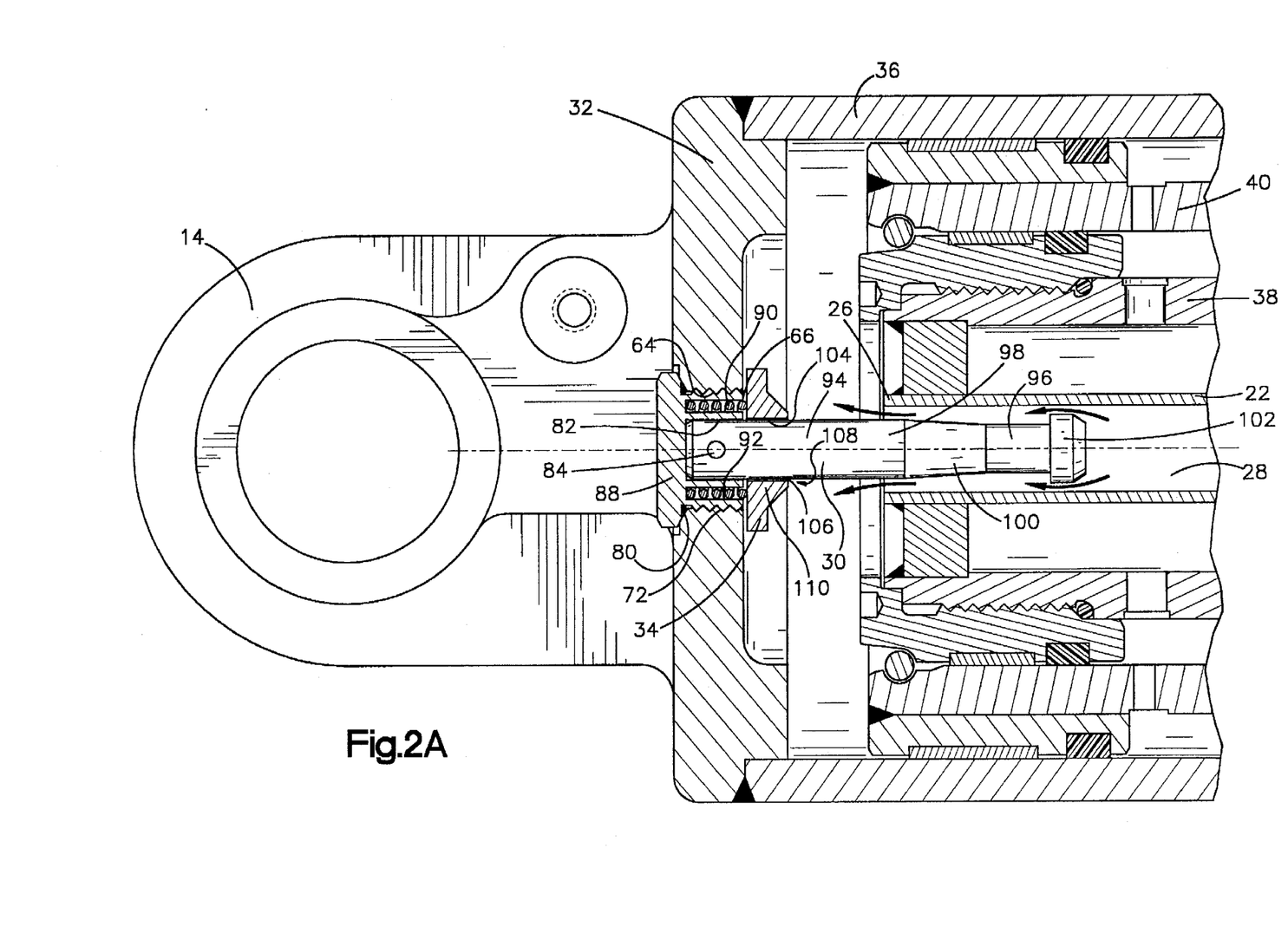
FIG. 2A is an enlarged cross-sectional view of another embodiment of a cushioning apparatus constructed in accordance with the invention.

An alternative embodiment of a plug 88 is shown in FIG. 2A, wherein parts of the plug 88 that are identical to parts of the plug 68 have the same reference numerals, and different parts have new reference numerals. The plug 88 receives a spring 90 into a longitudinally extending annular opening 92 of the plug 88. The spring 90 biases the poppet 34 in the longitudinal direction toward the conduit 22. The spring 90 is shown schematically in FIG. 2A. One skilled in the art would appreciate that the spring 90 must have sufficient capability (such as sufficient length) to push the poppet 34 all the way from the end cap 32 to the conduit mouth 26. A modified poppet 34 may be used, having a depression (not shown) for receiving an end of the spring 90.

The spool 30 has a body 94 that extends in the longitudinal direction in radial alignment with the conduit 22. The spool body 94 presently has longitudinally extending first and second cylindrical portions 96, 98 of uniform diameter, the second portion 98 preferably having a larger diameter than the first portion 96.

The spool 30 preferably includes a longitudinally extending, partially frustoconical portion 100 disposed between the first and second portions 96, 98 in the longitudinal direction. Alternatively, the spool 30 may have a uniform diameter along the entire length of its body. The frustoconical portion 100 preferably has a taper in a transverse, generally radial direction that decreases from the second cylindrical portion 98 toward the first cylindrical portion 96 along the longitudinal direction. The frustoconical portion 100 produces a substantially uniform change in pressure in the cylinder 10 as the dump body is lowered. The spool 30 has a head 102 with a larger diameter than the spool second portion 98, for limiting the movement of the poppet 34 in the longitudinal direction toward the conduit 22.

The poppet 34 is preferably disk-shaped with an interior surface 104 that defines a central orifice 106. The diameter of the poppet orifice 106 is greater than the diameter of the spool second portion 98, forming a generally annular fluid passageway 108 between the exterior surface of the spool 30 and the interior poppet surface 104. The poppet 34 has a tapered central protruding portion 110 around the orifice 106 that decreases in thickness in a transverse, generally radial direction from the outer periphery of the poppet toward the poppet orifice 106. The poppet central portion 110 is adapted for abutting against the mouth 26 at the second conduit end portion 28.

As the dump body is lowered, the poppet 34 moves in a sliding manner toward the conduit 22, in which it travels along the second spool portion 98, the tapered spool portion 100 and the first spool portion 96. Because at times the cylinder 10 is oriented substantially vertically when in use, the oil pressure within the cylinder 10 and the force of gravity are alone sufficient for causing the poppet 34 to slide along the spool 30 toward the conduit 22. However, the spring 90 shown in FIG. 2A may also be used for biasing the poppet 34 toward the conduit 22.

The cylinder 10 of the present invention shown in FIG. 1 is "double acting", ie., oil flows into the cylinder 10 through the port 52 to cause retraction of the cylinder 10 and into the cylinder 10 through the port 25 to cause extension of the cylinder 10. The cylinder 10 may be double acting in all stages, as shown in FIG. 1, in which case oil flows through the inner passageway 46, the intermediate passageway 44 and the outer passageway 42. Alternatively, the cylinder 10 may be double acting in one stage only (not shown), in which case oil would flow, for example, through the inner passageway 46 and the intermediate passageway 44 only. The weight of the dump body would cause the outer cylinder 36 to retract in a manner known to those skilled in the art.

In the operation of the cylinder 10 shown in FIG. 1, which is double acting in all stages, the fully collapsed cylinder 10 is extended and dump body is raised by communicating pressurized oil into the cylinder 10. The oil is communicated into the cylinder 10 by activating a control valve to release fluid from the tank using an engine driven pump (not shown). The oil travels from the tank through the port 25 and to the first conduit end portion 24. From the first conduit end portion 24, the oil travels along the length of the conduit 22 to the second conduit end portion 28, as shown in FIG. 2.

The oil flows around the spool head 102, the spool first portion 96, the frustoconical portion 100, and the second spool portion 98, which are located in the conduit 22. The oil then flows out the mouth 26 of the conduit 22 to the interior of the cylinder 36. This moves the poppet 34 away from the conduit mouth 26 against the end cap 32, and extends the outer cylinder 36, hence raising the dump body away from the frame.

Figure 3:
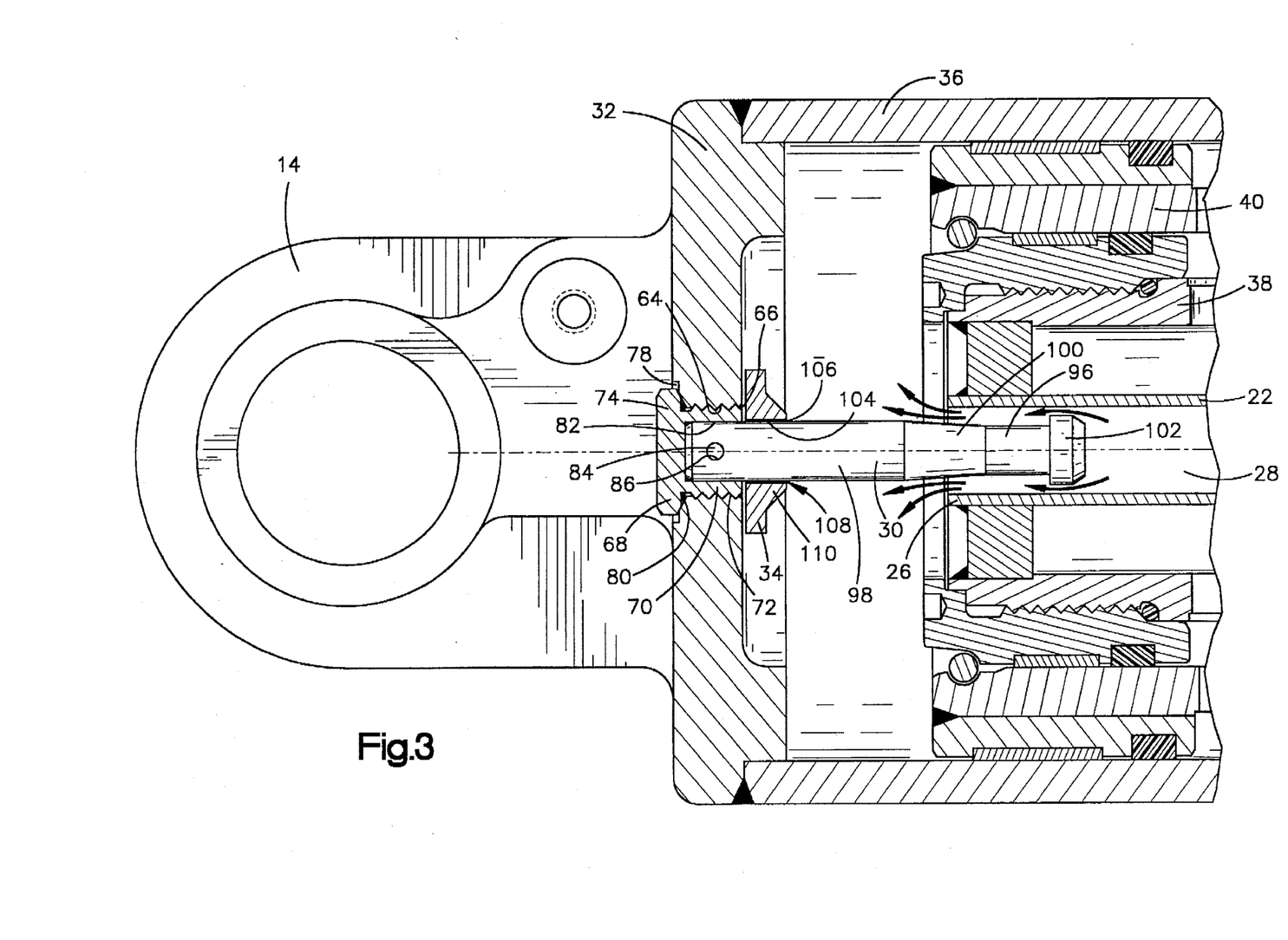
FIG. 3 is an enlarged cross-sectional view of a cushioning spool constructed in accordance with the invention, showing the spool being removed from a fluid transfer structure.

As shown in FIG. 3, as the outer cylinder 36 is being extended, the spool 30 is being moved in the longitudinal direction out of the conduit 22. As a result, the rate at which the oil leaves the conduit 22 increases, as depicted by the increased number of the arrows at the conduit mouth 26. The oil leaves the conduit 22 at an increased rate because at this point the spool tapered portion 100 is located at the mouth 26, the spool tapered portion 100 having a smaller diameter than that of the spool second portion 98 which was previously disposed in the conduit 22. The volume of the space between the spool 30 and the conduit 22 at the mouth 26 increases as the spool 30 is withdrawn from the conduit 22.

Figure 4:
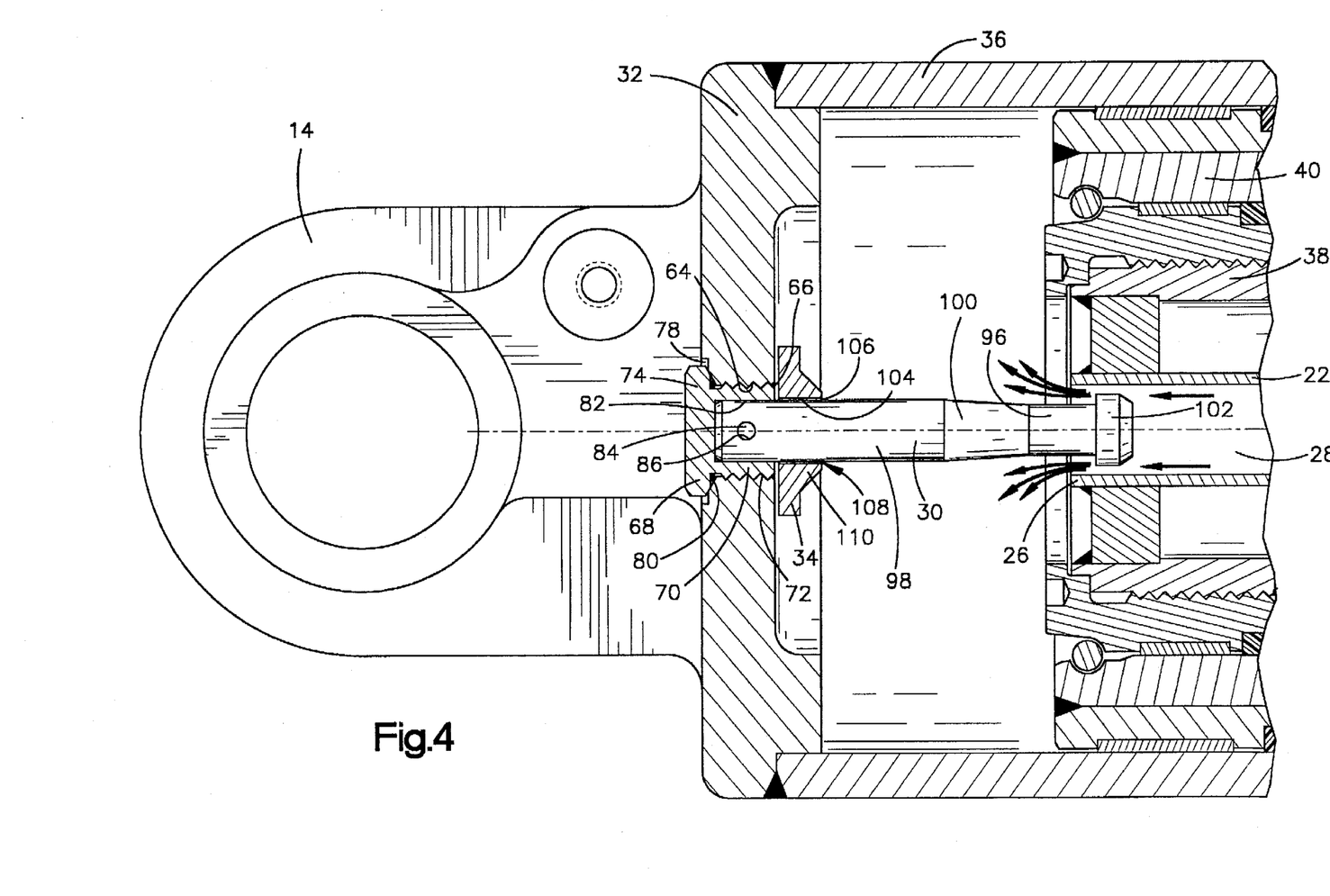
FIG. 4 is an enlarged cross-sectional view of the spool further removed from the fluid transfer structure than in FIG. 3.

As the dump body is raised further, the spool 30 continues to be moved out of the conduit 22, as shown in FIG. 4. At this point, the spool first portion 96 is located near the conduit mouth 26. Since the spool first portion 96 has the smallest diameter of the spool 30, the volume of the space between the spool 30 and the conduit 22 at the conduit mouth 26 is now the greatest. Therefore, the rate at which the oil leaves the conduit 22 into the cylinder 10 increases further.

The extent by which the cylinder 10 is extended and the degree that the dump body is tilted are controlled by an operator. As the cylinder 10 is extending, the travel of the outer cylinder 36 ends when the outer piston 54 engages the outer stop member 56. The travel of the intermediate cylinder 40 ends when the inner piston 58 engages the inner stop member 60. Oil has exited the outer passageway 42 into the intermediate passageway 44 through the outer opening 48. Oil then travels to the inner passageway 46 through the inner opening 50. From the inner passageway 46 the oil travels through the port 52 into the tank.

When the operator decides to lower the dump body, he/she activates the operating control valve to communicate pressurized oil into the cylinder 10 through the port 52. Oil then enters the inner passageway 46 into the intermediate passageway 44 through the inner opening 50. This forces the inner piston 58 away from the inner stop member 60, causing the intermediate cylinder 40 to retract. Oil then passes into the outer passageway 42, which forces the outer piston 54 away from the outer stop member 56, causing the outer cylinder 36 to retract. As the intermediate cylinder 40 and the outer cylinder 36 retract, oil is discharged from the outer cylinder 36 by flowing through the conduit 22 out of the port 25 and into the tank. Prior to the spool 30 entering the conduit 22, there is a free-flow of fluid into the conduit 22, which causes the dump body to be lowered at a rapid rate.

Figure 5:
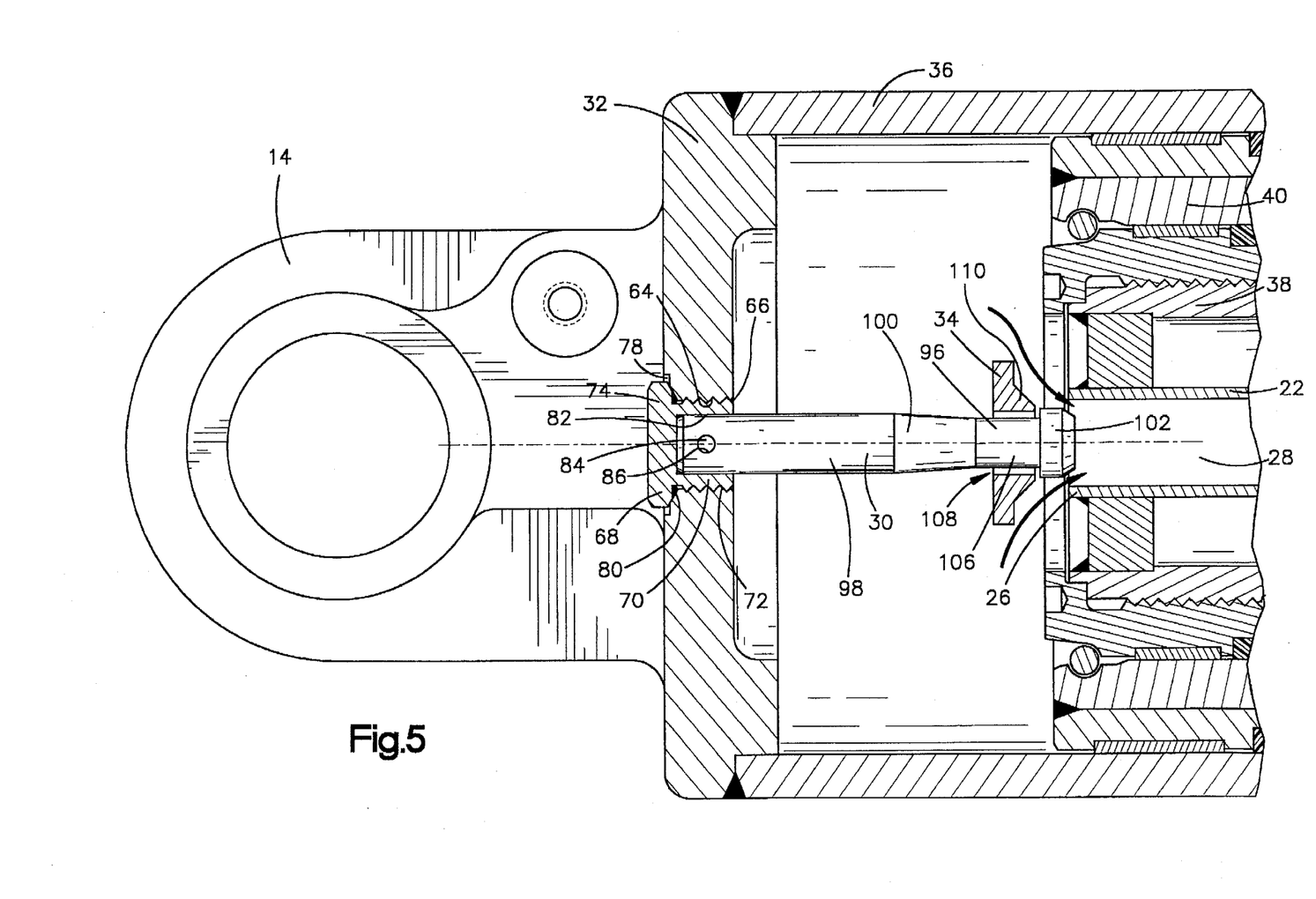
FIG. 5 is an enlarged cross-sectional view of the retraction of the cylinder as the dump body is lowered, the spool and the poppet being shown prior to entering the fluid transfer structure.

As shown in FIG. 5, at one point during the lowering stroke the spool head 102 is located adjacent the conduit mouth 26. The poppet 34 is disposed around the first spool portion 96 outside the conduit 22. The fluid flow out of the cylinder 36 into the conduit 22 and the force of gravity have caused the poppet 34 to slide along the spool 30 toward the conduit 22. If the plug 88 is used, the added force of the spring 90 assists in biasing the poppet 34 toward the conduit 22. The fluid passes around the poppet 34 and the spool head 102 into the conduit 22.

Figure 6:
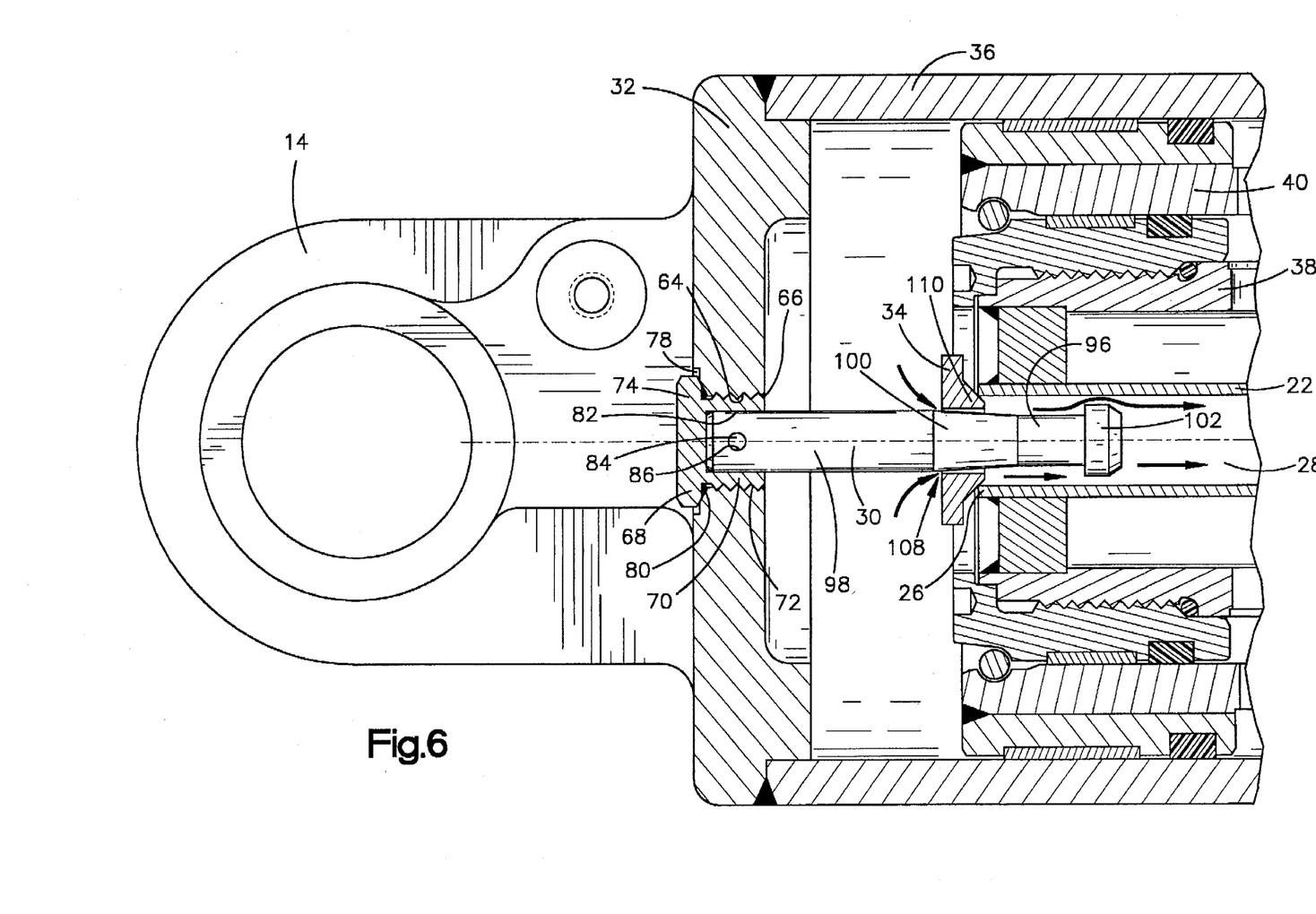
FIG. 6 is an enlarged cross-sectional view of the cylinder near the end of its lowering stroke, showing the poppet being received by the fluid transfer structure.

FIG. 6 shows that in the last several inches of stroke prior to the dump body impacting pads of the vehicle frame, the spool 30 and the poppet 34 enter the conduit 22. The poppet central portion 110 preferably contacts the second conduit end portion 28, reducing the flow of fluid into the conduit 22 by preventing substantially all fluid flow between the outer periphery of the poppet 34 and the conduit 22. The fluid is forced to travel through the fluid passageway 108, which creates a high trapped pressure that decreases the cylinder stroke rate. This provides a cushioning effect that reduces the velocity of the dump body to an acceptable level in the last several inches of stroke as the dump body is lowered. Therefore, the dump body gently contacts the frame pads, which avoids damage to the dump body, the frame and the cylinder 10.

The cushioning apparatus 20 of the present invention may be used in a cylinder with retract cushioning only (such as the cylinder 10 shown in FIG. 1), but also may be used in a cylinder that has extend cushioning capabilities. Extend cushioning may be explained, for example, by reference to a cylinder which is double acting in one stage only. This will be described by reference to FIG. 1.

If the cylinder 10 were double acting in one stage only, a ball check valve (not shown) would be disposed in the cylinder 10 between the inner passageway 46 and the intermediate passageway 44 near the conduit mouth 26. Also, a series of orifices (also not shown) would be provided in the inner cylinder 38 near the valve. Openings 48 and 50 would not be present in the cylinder 10.

For extending the cylinder, which is double acting in only one stage, pressurized oil communicates through the port 25 into the conduit 22. This causes the outer cylinder 36 to expand and the outer piston 54 to move until it engages the outer stop member 56, in turn moving the inner piston 58. Oil from intermediate passageway 44 closes the check valve and flows through the orifices in the inner cylinder 38. Oil now flows through inner passageway 46 out through the port 52 and into the tank. The bearing 63 of the inner piston 58 passes over the orifices, slowing the cylinder extension rate.

For retraction of the cylinder, which is double acting in only one stage, pressurized oil communicates through the port 52 and through the inner passageway 46. This opens the check valve and oil flows into the intermediate passageway 44. Oil is discharged from the outer cylinder 36 by flowing through the conduit 22 and out through the port 25. The weight of the dump body causes the outer piston 54 to slide. The spool 30 and the poppet 34 operate as previously described for the cylinder 10 which is double acting in all stages.

Figure 7:
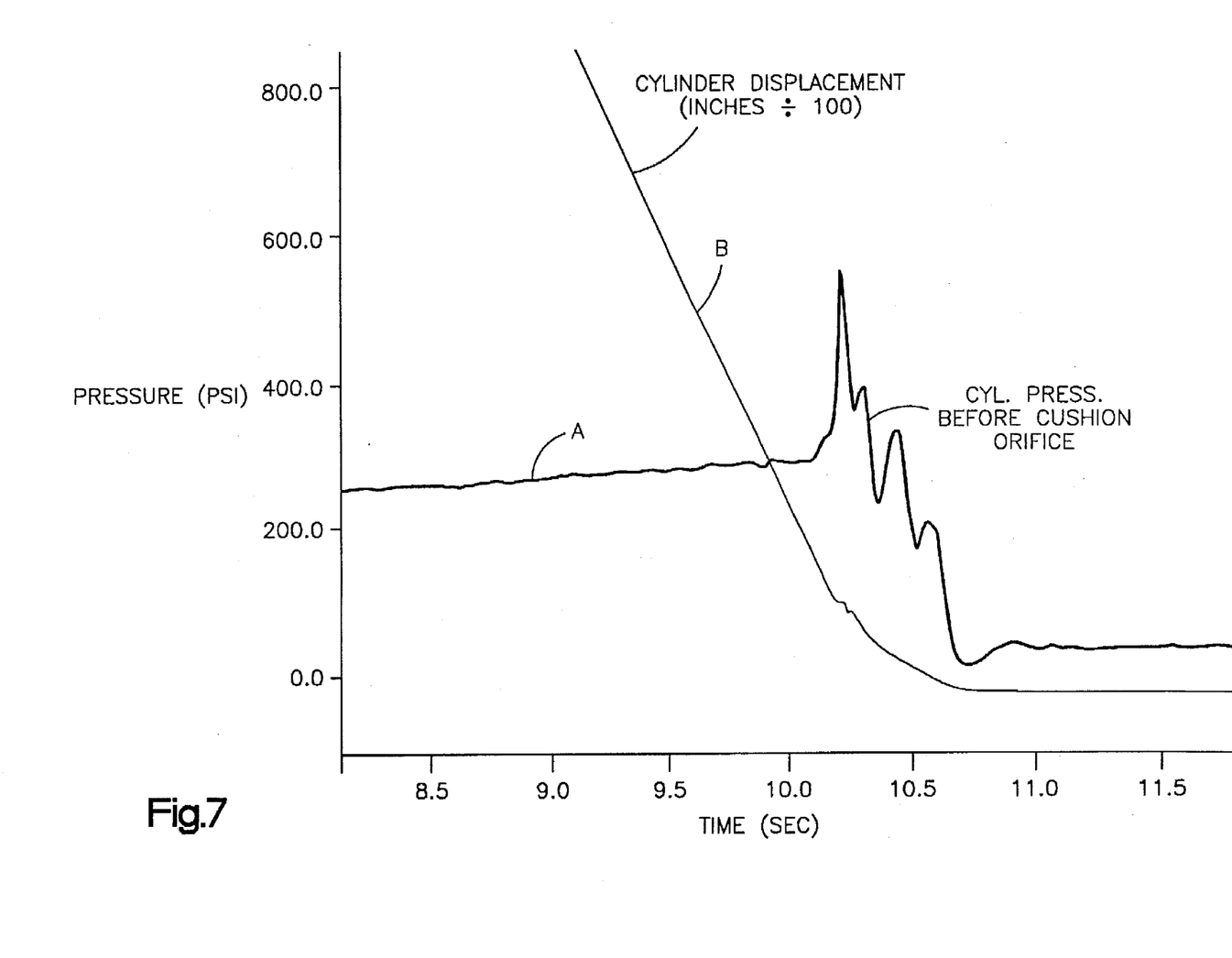
FIG. 7 is a graph showing the effect of a spool of uniform diameter on cylinder pressure (curve A) and cylinder displacement (curve B), the cylinder being connected to an empty dump body.

FIG. 7 shows the effect that a spool body 94 with a uniform diameter along its entire length has on cylinder pressure and displacement, when the dump body is being lowered. The flow rate in the retracting cylinder 10, as measured at the ports 25, 52, is determined according to the formula:

$$Q = 24.12 \times A \times \sqrt{\Delta P}$$

where Q=flow rate, A=orifice area in square inches, and ΔP=pressure drop across the orifice. After about 10 seconds the spool 30 and the poppet 34 decreased the velocity of the dump body from greater than about 6 inches/second to less than about 3 inches/second, in particular, to about 2 inches/second. The spool 30 and the poppet 34 thus reduced the velocity of the dump body by at least 50%.

As the dump body continued to be lowered, sharp peaks in pressure occurred in decreasing magnitude between about 10 and 11 seconds. These pressure peaks were believed to have been caused by an increase in pressure due to the spool 30 being disposed in the conduit 22, which slowed the rate of travel of the dump body. This slowed rate of travel, in turn, changed the pressure drop across the orifice 106, thus allowing the dump body to increase in speed. Such a repeated process resulted in the pressure peaks, which occurred until the dump vehicle body was cradled to the frame.

Figure 8:
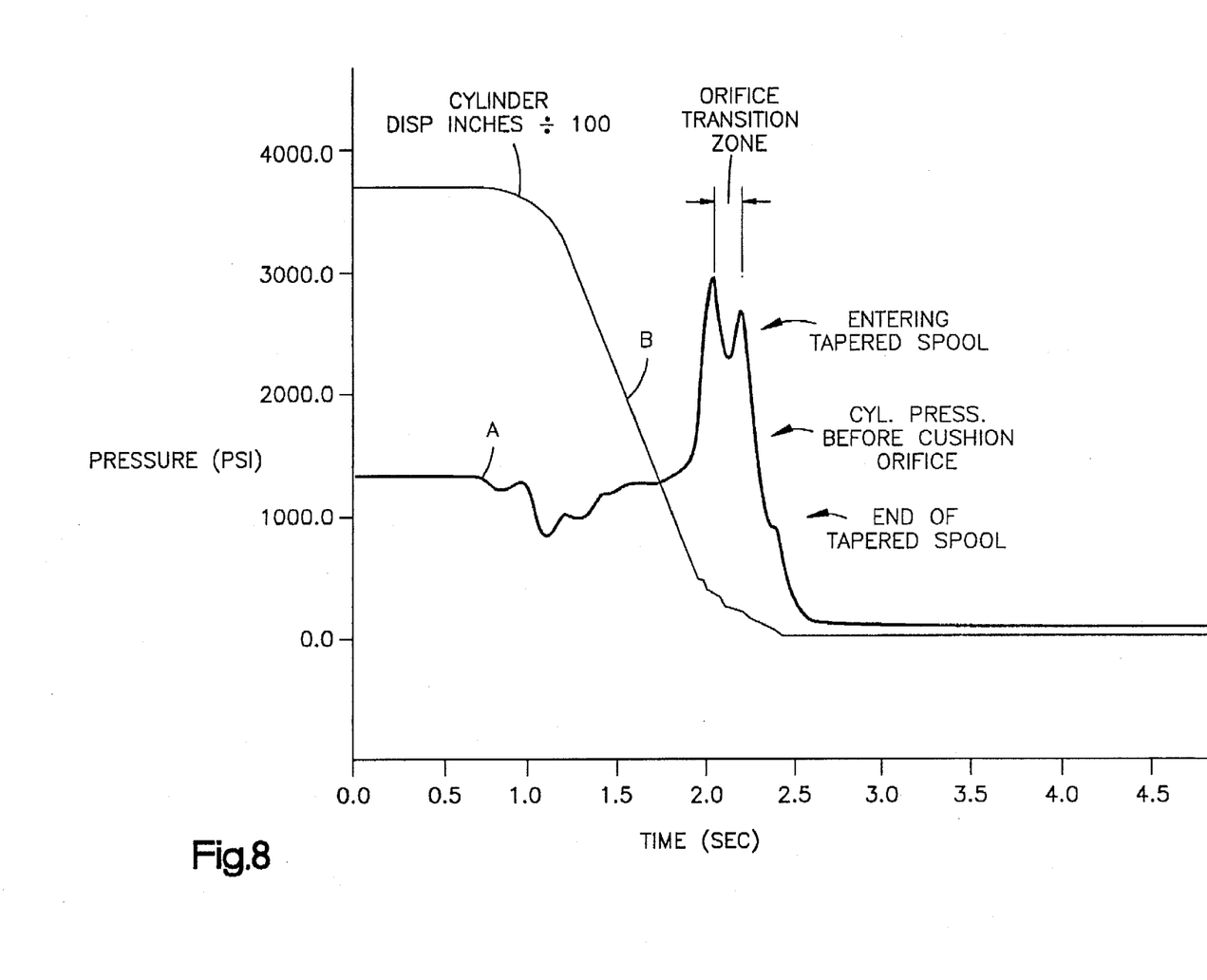
FIG. 8 is a graph showing the effect of a tapered spool on cylinder pressure (curve A) and cylinder displacement (curve B), the cylinder being connected to a loaded dump body.

FIG. 8 shows the advantageous effects that the spool frustoconical portion 100 and has on cylinder pressure and displacement. The loaded dump body condition shown here is the worst condition in which the cylinder 10 is used because the load increases the pressure in the cylinder 10. This increased pressure increases the velocity of the body when it is lowered.

After about 2 seconds, the tapered spool 30 and the poppet 34 decreased the velocity of the dump body from greater than about 35 inches/second to less than about 15 inches/second, and in particular, to about 11 inches/second. Thus, using the tapered spool 30 and the poppet 34 resulted in at least a 40% reduction in velocity as the dump body was lowered. Pressure peaks between 1.5 and 2.5 seconds were created in a manner similar to those described with respect to FIG. 7. These pressure peaks occurred at approximately the time at which the tapered spool 30 became effective.

Using the tapered spool 30 with the poppet 34 is advantageous in that during the last few inches of stroke, in addition to greatly reducing the velocity of the dump body as it is lowered, the tapered spool and the poppet 34 increased the uniformity of the fluid flow rate across the orifice 106. This is evident by the reduced number, as well as the reduced sharpness, of the pressure peaks between 2 and 2.5 seconds.

Although the invention has been described in its preferred form with a certain degree of particularity, it will be understood that the present disclosure of the preferred embodiments has been made only by way of example and that various changes may be resorted to without departing from the true spirit and scope of the invention as hereafter claimed.

What is claimed is:

1. An apparatus for cushioning a body of a dump vehicle when the body is lowered, comprising structure forming a fluid passageway between end portions of the structure, the structure being adapted to be disposed in a fluid pressure operated actuator used to raise and lower a body of a dump vehicle, wherein when the structure is disposed in such actuator the passageway extends in a longitudinal direction of such actuator and one of the end portions communicates with an interior of such actuator, a cushioning spool adapted to be connected to such actuator for moving in the longitudinal direction into the passageway, and a poppet with an orifice that receives said spool for enabling said poppet to be slidably movable on said spool in the longitudinal direction, wherein said poppet has a size that is greater than a size of the passageway in a direction transverse to the longitudinal direction and said poppet is adapted to be movable on said spool externally of said structure.

2. The apparatus of claim 1 wherein said spool has a radially tapered partially frustoconical portion.

3. An apparatus for cushioning a body of a dump vehicle when the body is lowered, comprising structure defining a fluid passageway between end portions of the structure, the structure being adapted to be disposed in a fluid pressure operated actuator used to raise and lower a body of a dump vehicle, wherein when the structure is disposed in such actuator the passageway extends in a longitudinal direction of such actuator and one of the end portions communicates with an interior of such actuator, a cushioning spool adapted to be connected to such actuator for moving in the longitudinal direction into the passageway, wherein said spool has a radially tapered partially frusto-conical portion, a first cylindrical portion, and a second cylindrical portion having a diameter greater than a diameter of said first cylindrical portion, each of the cylindrical portions being disposed near an opposite end of said frustoconical portion, and a poppet with an orifice that receives said spool for enabling said poppet to be slidably movable on said spool in the longitudinal direction.

4. The apparatus of claim 1 wherein said poppet is disk-shaped.

5. The apparatus of claim 3 wherein said poppet orifice has a diameter greater than the diameter of said second cylindrical portion, forming a fluid passageway between said spool and said poppet.

6. The apparatus of claim 1 wherein said poppet has a protrusion around the orifice for abutting against the second structure end portion.

7. The apparatus of claim 3 wherein said spool includes a cylindrical head portion having a larger diameter than the diameter of said second cylindrical portion.

8. A fluid pressure operated cylinder for cushioning a body of a dump vehicle when such body is lowered, comprising an outer cylinder member elongated in a longitudinal direction and adapted to be connected at one end to one of a dump body and support structure of a dump vehicle, fluid transfer structure forming a fluid passageway in the outer cylinder member between end portions of said structure, wherein the passageway extends in the longitudinal direction and one of the end portions of said fluid transfer structure communicates with an interior of the outer cylinder member, a cushioning spool connected to the outer cylinder member for moving in the longitudinal direction into the passageway, and a poppet with an orifice that receives said spool for enabling said poppet to be slidably movable on said spool in the longitudinal direction, wherein said poppet has a size that is greater than a size of the passageway in a direction transverse to the longitudinal direction and said poppet is adapted to be movable on said spool externally of said fluid transfer structure.

9. The cylinder of claim 8 further comprising an inner cylinder member extending in the longitudinal direction and disposed between said outer cylinder member and said fluid transfer structure in the transverse direction, said inner cylinder member being pivotally connected to the support structure of the dump vehicle and said outer cylinder member being pivotally connected to the dump body.

10. The cylinder of claim 9 further comprising one or more intermediate cylinder members extending in the longitudinal direction, said intermediate cylinder members being telescopically connected and disposed between said outer cylinder member and said inner cylinder member.

11. The cylinder of claim 8 wherein said spool has a radially tapered partially frustoconical portion.

12. A fluid pressure operated cylinder for cushioning a body of a dump vehicle when such body is lowered, comprising:

an outer cylinder member elongated in a longitudinal direction and adapted to be connected at one end to one of a dump body and support structure of a dump vehicle;

fluid transfer structure defining a fluid passageway in the outer cylinder member between end portions of said structure, wherein the passageway extends in the longitudinal direction and one of the end portions of said fluid transfer structure communicates with an interior of the outer cylinder member;

a cushioning spool connected to the outer cylinder member for moving in the longitudinal direction into the passageway, wherein said spool has a radially tapered partially frustoconical portion, a first cylindrical portion, and a second cylindrical portion having a diameter greater than a diameter of said first cylinder portion, each of the cylindrical portions being disposed near an opposite end of the frustoconical portion, and a poppet with an orifice that receives said spool for enabling said poppet to be slidably movable on said spool in the longitudinal direction.

13. The cylinder of claim 8 wherein said poppet is disk-shaped.

14. The cylinder of claim 12 wherein the diameter of said poppet orifice is greater than the diameter of said second cylindrical portion, forming a fluid passageway between said spool and said poppet.

15. The cylinder of claim 8 wherein said poppet has a protrusion around the poppet orifice for abutting against said one end portion of said fluid transfer structure.

16. The cylinder of claim 12 wherein said spool includes a cylindrical head portion having a larger diameter than the diameter of said second cylindrical portion.

17. The cylinder of claim 8 wherein said cylinder is adapted to use hydraulic fluid.

18. A method for cushioning a body of a dump vehicle when the body is lowered, comprising the steps of retracting a fluid pressure operated actuator used to raise and lower a body of a dump vehicle, lowering the body of the dump vehicle by discharging fluid from the actuator through a fluid passageway in the actuator, moving into the fluid passageway a spool which is connected to the actuator, sliding a poppet along said spool from a position exterior of the fluid passageway toward the fluid passageway, and restricting the flow of fluid into the fluid passageway with said spool and said poppet.

19. The method of claim 18 further comprising decreasing pressure in the actuator at a substantially uniform rate.

20. The method of claim 18 further comprising preventing discharge of all fluid through the passageway except through an opening between said poppet and said spool.

21. A fluid pressure operated cylinder for cushioning a body of a dump vehicle when such body is lowered, comprising:

an outer cylinder member elongated in a longitudinal direction and adapted to be connected at one end to one of a dump body and support structure of a dump vehicle;

a fluid transfer conduit forming a fluid passageway in the outer cylinder member between end portions of said fluid transfer conduit, wherein the passageway extends in the longitudinal direction and one of the end portions of said fluid transfer conduit communicates with an interior of the outer cylinder member;

a cushioning spool connected to the outer cylinder member for moving in the longitudinal direction into the passageway, said spool having an exterior surface; and a poppet with an interior surface forming an orifice that receives said spool, said poppet having a size that is greater than a size of the passageway in a direction transverse to the longitudinal direction, said poppet being slidably movable on said spool in the longitudinal direction between a position exterior of the passageway and another position in contact with said fluid transfer conduit, wherein when in contact with said fluid transfer conduit said poppet restricts substantially all fluid flow into or from the passageway to a region between said exterior spool surface and said interior poppet surface.

22. The apparatus of claim 1 wherein said spool is imperforate.

23. The apparatus of claim 8 wherein said spool is imperforate.

* * * * *